United States Patent
Kim (10) Patent No.: US 11,724,680 B2
(45) Date of Patent: Aug. 15, 2023

(54) APPARATUS FOR BRAKING USING ELECTRIC BOOSTER AND CONTROL METHOD THEREOF

(71) Applicant: HYUNDAI MOBIS CO., LTD., Seoul (KR)

(72) Inventor: Jong Sung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 476 days.

(21) Appl. No.: 16/938,744

(22) Filed: Jul. 24, 2020

(65) Prior Publication Data

US 2021/0078555 A1    Mar. 18, 2021

(30) Foreign Application Priority Data

Sep. 18, 2019    (KR) ......................... 10-2019-0114564

(51) Int. Cl.
| | |
|---|---|
| *B60T 13/74* | (2006.01) |
| *B60T 13/58* | (2006.01) |
| *B60T 13/14* | (2006.01) |
| *B60T 8/40* | (2006.01) |

(52) U.S. Cl.
CPC .......... *B60T 13/586* (2013.01); *B60T 13/142* (2013.01); *B60T 13/745* (2013.01); *B60T 8/4077* (2013.01)

(58) Field of Classification Search
CPC ...... B60T 13/686; B60T 13/74; B60T 13/745; B60T 8/4077; B60T 8/4872; B60T 13/142
See application file for complete search history.

(56) References Cited

U.S. PATENT DOCUMENTS

| | | | |
|---|---|---|---|
| 2015/0283987 A1* | 10/2015 | Bareiss | B60T 8/171 701/70 |
| 2015/0314686 A1* | 11/2015 | Knechtges | B60T 1/10 303/3 |
| 2017/0320474 A1* | 11/2017 | Svensson | B60T 17/02 |
| 2018/0251108 A1* | 9/2018 | Yamaguchi | F16K 31/0665 |
| 2020/0172068 A1* | 6/2020 | Leiber | B60T 13/686 |

(Continued)

FOREIGN PATENT DOCUMENTS

| CN | 104097623 A | 10/2014 |
|---|---|---|
| CN | 112440960 A | 3/2021 |
| KR | 10-2008-0044300 A | 5/2008 |

*Primary Examiner* — Bradley T King
(74) *Attorney, Agent, or Firm* — Morgan, Lewis & Bockius LLP (57) ABSTRACT

Provided are an apparatus for braking using an electric booster and a control method thereof. The apparatus for braking using an electric booster includes an electric booster connected to a master cylinder and configured to discharge braking hydraulic pressure by pressing a piston of the master cylinder with electric power of a motor together with a driver's pedal force, an electric hydraulic braking unit connected to the master cylinder through hydraulic lines, and configured to store braking hydraulic pressure in an accumulator and to perform ESC braking by driving a pumping motor, and a control unit configured to control the electric booster and the electric hydraulic braking unit, to compare required braking hydraulic pressure with preset reference hydraulic pressure when the ESC braking is required, and to perform ESC braking by the electric hydraulic braking unit or braking by the electric booster according to a result of the comparison.

10 Claims, 10 Drawing Sheets

(56) References Cited

U.S. PATENT DOCUMENTS

| | | | |
|---|---|---|---|
| 2020/0276964 A1* | 9/2020 | Goto | B60T 13/04 |
| 2020/0369248 A1* | 11/2020 | Marx | B60T 13/686 |
| 2021/0237582 A1* | 8/2021 | Patel | B60W 50/10 |
| 2021/0245721 A1* | 8/2021 | Klimpel | B60T 8/885 |
| 2021/0309200 A1* | 10/2021 | Wingender | B60T 13/145 |

* cited by examiner

APPARATUS FOR BRAKING USING ELECTRIC BOOSTER AND CONTROL METHOD THEREOF

CROSS-REFERENCE TO RELATED APPLICATION

This application claims priority from and the benefit of Korean Patent Application No. 10-2019-0114564, filed on Sep. 18, 2019, which is hereby incorporated by reference for all purposes as if set forth herein.

BACKGROUND

Field

Exemplary embodiments of the present disclosure relate to an apparatus for braking using an electric booster and a control method thereof, and more particularly, to an apparatus for braking using an electric booster, which stores braking hydraulic pressure in an accumulator of an electric hydraulic braking unit when performing braking control using an electric booster and performs ESC braking by using the stored braking hydraulic pressure, and a control method thereof.

Discussion of the Background

An electric booster braking system substantially maintains most of the braking mechanism of an existing vacuum booster, but is different in the boosting mechanism from the vacuum booster in that braking hydraulic pressure is boosted by the power of an electric booster (that is, a motor) using electric energy, instead of boosting braking hydraulic pressure by difference pressure between air pressure and vacuum pressure like a vacuum booster.

The electric booster braking system may be classified into two types according to whether a pedal simulator is installed. The electric booster braking system provided with the pedal simulator blocks a driver's pedal force generated when a driver presses a brake pedal and performs braking with only the power of the electric booster, and allows the driver to feel a pedal feeling, which is similar to that provided by the existing vacuum booster braking system, through a reaction force generated by a rubber damper or a spring of the pedal simulator.

On the other hand, the electric booster braking system provided with no pedal simulator forms a driver's pedal feeling in a method in which a part of a braking force is formed by a driver's pedal stepping force. For example, when the boosting ratio of the electric booster is 10:1, 10% of the total braking force is formed by the driver's pedal stepping force and 90% thereof is formed by the electric booster. That is, the electric booster braking system provided with no pedal simulator forms the driver's pedal feeling by allowing a part of the total braking force to be formed by the driver's pedal stepping force.

The electric booster refers to an electronically controlled booster that boosts power using a driving force of a motor instead of atmospheric pressure, unlike the existing vacuum booster that boosts power using a difference between vacuum pressure and atmospheric pressure. As in the vacuum booster, output is formed by the distribution ratio (about 1:8 to about 1:9) of driver's power and motor's power before a maximum point (full load point) to be boosted, but additional power in a subsequent section is formed only by the driver's power. Although braking control is performed using such an electric booster, the price competition in the electric booster market has intensified.

In this regard, when performing braking control using the electric booster, a more cost competitive braking technology is required.

The background art of the present disclosure is disclosed in Korean Patent Application Laid-Open No. 10-2008-0044300 (published on May 20, 2008 and entitled "Motor Vehicle Braking System").

SUMMARY

Various embodiments are directed to providing an apparatus for braking using an electric booster, which stores braking hydraulic pressure in an accumulator of an electric hydraulic braking unit when performing braking control using an electric booster and performs ESC braking by using the stored braking hydraulic pressure, and a control method thereof.

Problems to be solved by the present disclosure are not limited to the aforementioned problem(s), and other unmentioned problems will be clearly understood by those skilled in the art from the following description.

In an embodiment, an apparatus for braking using an electric booster includes: an electric booster connected to a master cylinder and configured to discharge braking hydraulic pressure by pressing a piston of the master cylinder with electric power of a motor together with a driver's pedal force that presses a brake pedal; an electric hydraulic braking unit connected to the master cylinder through a pair of hydraulic lines, and configured to store braking hydraulic pressure discharged from the master cylinder in an accumulator through the hydraulic lines and an outlet valve and to perform electronic stability control (ESC) braking by driving a pumping motor by using the braking hydraulic pressure stored in the accumulator; and a control unit configured to control the electric booster and the electric hydraulic braking unit, to compare required braking hydraulic pressure by the driver's pedal force with preset reference hydraulic pressure when the ESC braking is required, and to perform ESC braking by the electric hydraulic braking unit or braking by the electric booster according to a result of the comparison.

In the present disclosure, when the required braking hydraulic pressure is equal to or less than the reference hydraulic pressure, the control unit may perform the ESC braking by the electric hydraulic braking unit, and when the required braking hydraulic pressure exceeds the reference hydraulic pressure, the control unit may perform the braking by the electric booster.

In the present disclosure, when performing the ESC braking by the electric hydraulic braking unit, the control unit opens the outlet valve, advances the piston of the master cylinder to discharge braking hydraulic pressure, and when the required braking hydraulic pressure by the driver's pedal force is stored in the accumulator, the control unit closes the outlet valve, retracts the piston of the master cylinder, and controls the ESC braking to be performed.

In the present disclosure, when the piston of the master cylinder is retracted, the control unit may substantially prevent the piston from retracting beyond a cut-off hole.

In the present disclosure, the control unit may not operate the pumping motor until the required braking hydraulic pressure is completely stored in the accumulator.

In the present disclosure, when the ESC braking is completed, the control unit may move the piston of the master cylinder to a home position, and further operate the pumping motor for a predetermined period of time.

In an embodiment, a control method of an apparatus for braking, which uses an electric booster that is connected to a master cylinder and discharges braking hydraulic pressure by pressing a piston of the master cylinder with electric power of a motor together with a driver's pedal force that presses a brake pedal, includes: a step in which, when ESC braking is required, a control unit compares required braking hydraulic pressure by the driver's pedal force with preset reference hydraulic pressure; and a step in which, when the required braking hydraulic pressure is equal to or less than the reference hydraulic pressure, the control unit performs ESC braking by an electric hydraulic braking unit connected to the master cylinder through a pair of hydraulic lines.

In the present disclosure, the step of performing the ESC braking by the electric hydraulic braking unit may include: a step in which the control unit opens an outlet valve of the electric hydraulic braking unit, advances a piston of the master cylinder, and stores braking hydraulic pressure discharged from the master cylinder in an accumulator through the hydraulic lines and the outlet valve; and a step in which, when the required braking hydraulic pressure by the driver's pedal force is stored in the accumulator, the control unit retracts the piston of the master cylinder, closes the outlet valve, and performs the ESC braking.

In the present disclosure, in the step of performing the ESC braking, when the piston of the master cylinder is retracted, the control unit may substantially prevent the piston from retracting beyond a cut-off hole.

In the present disclosure, the control method may further include, after the step of performing the ESC braking, a step in which the control unit moves the piston of the master cylinder to a home position, and further operates a pumping motor for a predetermined period of time.

In the present disclosure, when the required braking hydraulic pressure exceeds the reference hydraulic pressure, the control unit may perform braking by the electric booster.

In the present disclosure, in the step of performing the ESC braking by the electric hydraulic braking unit, the control unit may open the outlet valve of the electric hydraulic braking unit, advance or retract the piston of the master cylinder, and perform the ESC braking while storing the braking hydraulic pressure discharged from the master cylinder in the accumulator through the hydraulic lines and the outlet valve.

According to an apparatus for braking using an electric booster and a control method thereof in accordance with an aspect of the present disclosure, braking hydraulic pressure is stored in an accumulator of an electric hydraulic braking unit when braking control is performed using an electric booster and ESC braking is performed using the stored braking hydraulic pressure, resulting in an effect that the cost of the braking apparatus using the electric booster is reduced.

Effects of the present disclosure are not limited to the aforementioned effects and may include various effects within the range obvious to those skilled in the art from the following description.

DETAILED DESCRIPTION OF THE ILLUSTRATED EMBODIMENTS

As is traditional in the corresponding field, some exemplary embodiments may be illustrated in the drawings in terms of functional blocks, units, and/or modules. Those of ordinary skill in the art will appreciate that these blocks, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus for braking using an electric booster and a control method thereof in accordance with an embodiment of the present disclosure will be described below with reference to the accompanying drawings. In this process, the thicknesses of lines or the sizes of elements illustrated in the drawings may be exaggerated for the purpose of clarity and convenience of explanation.

Furthermore, terms to be described later are terms defined in consideration of functions thereof in the present disclosure and may be changed according to the intention of a user or an operator, or practice. Accordingly, such terms should be defined based on the disclosure over the present specification.

Furthermore, the implementations described in the present specification may be implemented with a method or process, an apparatus, a software program, and a data stream or signal, for example. Although discussed only in the context of a single form of implementation (for example, discussed only as a method), implementations of the discussed features may also be implemented as other forms (for example, an apparatus or a program). The apparatus may be implemented with appropriate hardware, software, firmware and the like. The method may be implemented in an apparatus such as a processor generally referring to a processing device including a computer, a microprocessor, an integrated circuit, or a programmable logic device. The processor includes a communication device such as a computer, a cellular phone, a portable/personal digital assistants (PDA), and other devices that facilitate communication of information between end users.

Figure 1:
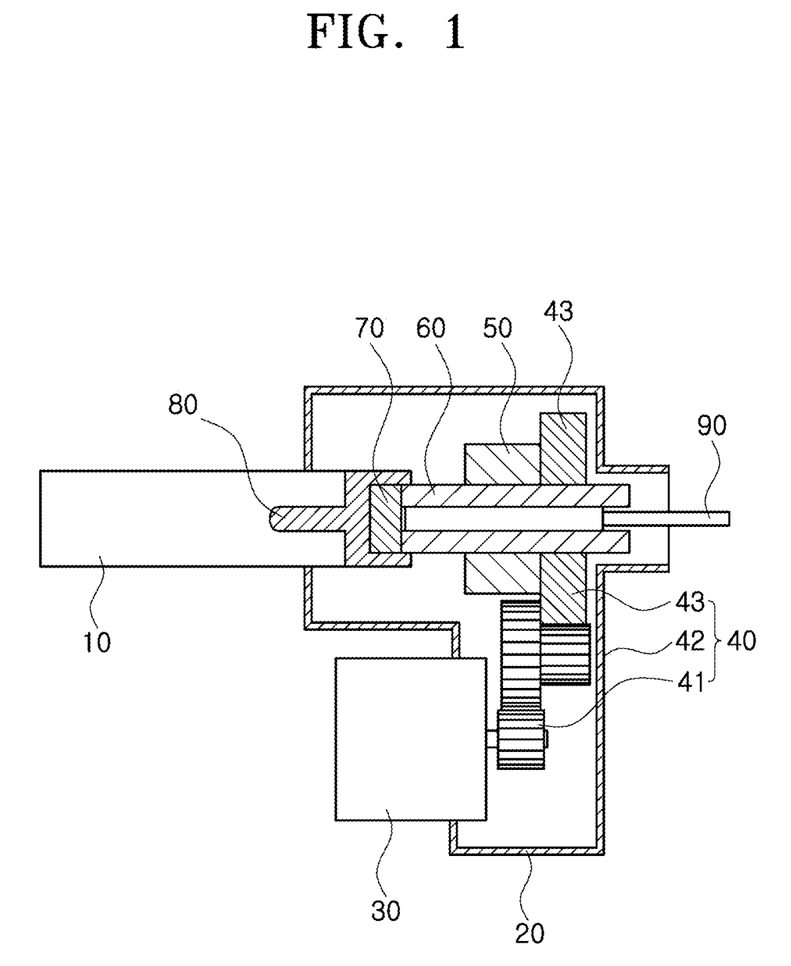
FIG. 1 is a configuration diagram schematically illustrating an electric booster in accordance with an embodiment of the present disclosure.
Figure 2A:
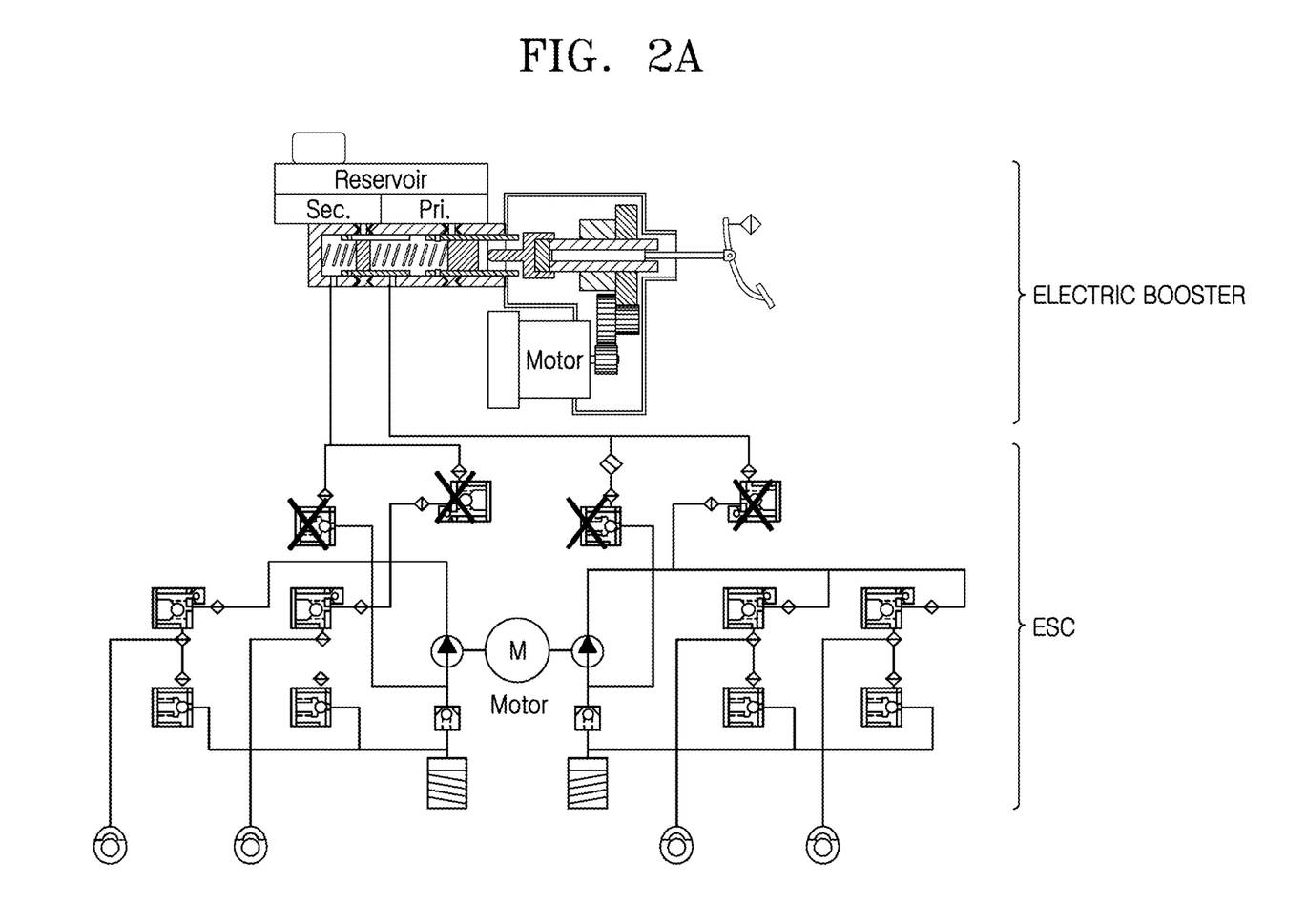
FIGS. 2A and 2B are diagrams for explaining an apparatus for braking using an electric booster in accordance with the present disclosure.
Figure 2B:
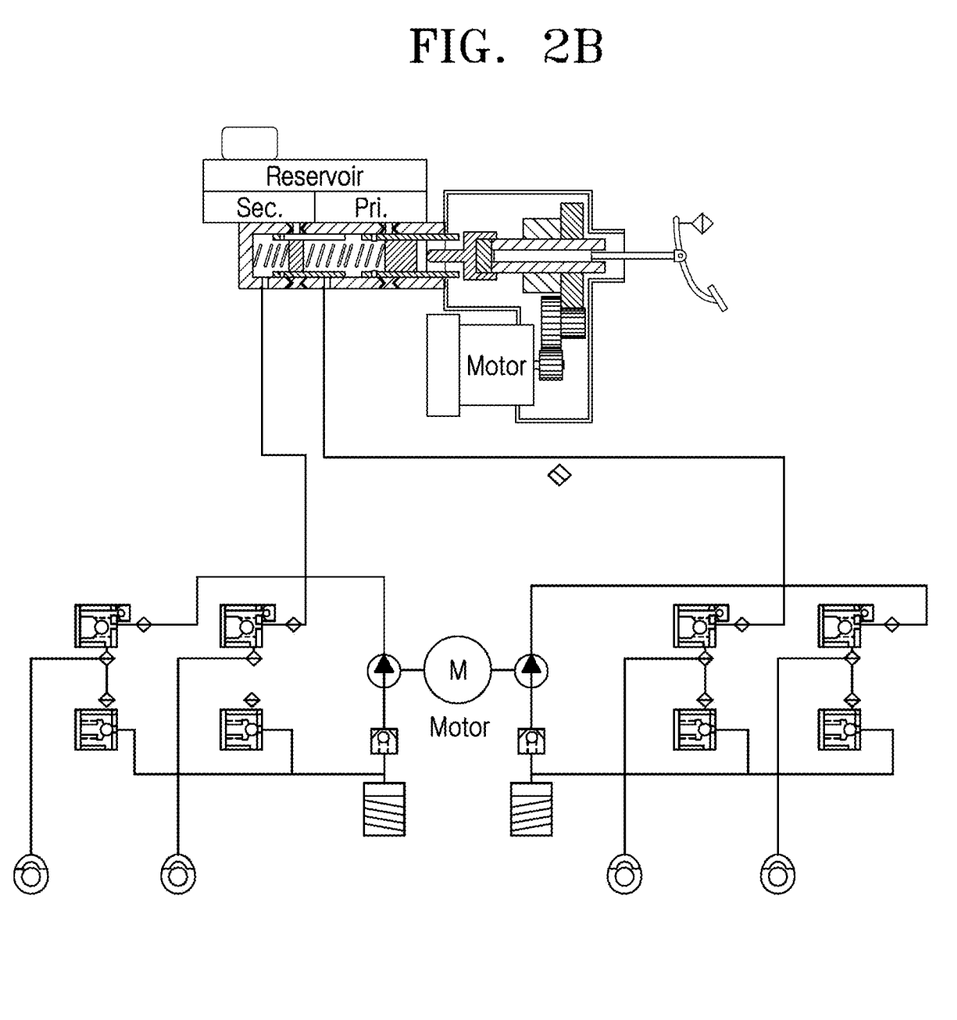

FIG. 1 is a configuration diagram schematically illustrating an electric booster in accordance with an embodiment of the present disclosure, and FIGS. 2A and 2B are diagrams for explaining an apparatus for braking using an electric booster in accordance with the present disclosure.

Referring to FIG. 1, an electric booster 20 in accordance with an embodiment of the present disclosure may be connected to a master cylinder 10 to press a reaction disk 70 with electric power of a motor 30 together with a driver's pedal force, thereby pressing a piston of the master cylinder 10 through a push rod 80 and generating a braking force.

In the electric booster 20, a gear part 40 including a first gear 41, a second gear 42, and a third gear 43 is connected to the motor 30, a nut screw part 50 is coaxially connected to the third gear 43 so as to be rotated with the third gear 43 and constrained to the third gear 43, and the nut screw part 50 and a bolt screw part 60 are screw-coupled to each other by passing through the rotational central axis of the nut screw part 50 so that the rotational motion of the nut screw part 50 is converted into a linear motion to press the reaction disk 70.

Furthermore, an operation rod 90 is provided to press the reaction disk 70 with a driver's pedal force through a hollow portion of the bolt screw part 60.

Accordingly, in a case where the motor 30 is driven, when torque boost is generated through the gear part 40, the torque is transmitted to the nut screw part 50 by the third gear 43, the rotational motion of the nut screw part 50 is constrained, and the reaction disk 70 is pressed by the linear motion of the bolt screw part 60, so that the push rod 80 presses the piston of the master cylinder 10 to generate a braking force.

At this time, the operation rod 90 is operated by the driver's pedal force to press the center part of the reaction disk 70, so that the braking force is generated by the driver's pedal force together with electric power by the motor 30.

Hereinafter, a mechanism of the electric booster 20 for forming the pedal feeling will be described. The driver's pedal force is transmitted to the push rod 80 via the reaction disk 70 through the operation rod 90, and the push rod 80 presses the piston of the master cylinder 10 to generate braking pressure. At this time, the driver's pedal force presses the push rod 80 together with the electric power generated by the motor 30.

Meanwhile, an apparatus for braking using the electric booster 20 in accordance with the present disclosure is a 2-box braking system, and performs a necessary braking function by combining an electric hydraulic braking unit 200 and the electric booster 20 that perform ESC functions, and may be configured as illustrated in FIG. 2B. That is, since the apparatus for braking using the electric booster 20 in accordance with the present disclosure performs some of the functions of the ESC by cooperative control of the electric booster 20, the apparatus is characterized in that a master cylinder and the electric hydraulic braking unit 200 are connected as illustrated in FIG. 2A and four valves formed on hydraulic lines 210 are removed. The removed solenoid valves are a suction valve, which is required to suck a brake fluid from a reservoir and the master cylinder when the ESC functions are performed, and a TCV which substantially prevents braking pressure, which is generated when the ESC performs ESC braking for vehicle attitude control in a state in which a brake pedal is not stepped on, from leaking into the reservoir. In relation to these valves, two valves per circuit are required, and when the present disclosure is applied, the total four solenoid valves can be removed. When the total four solenoid valves are removed, solenoid coils of a control unit ECU for operating the solenoid valves are also removed, resulting in a further increase in the cost reduction effect.

As described above, since the suction valve and the TCV are removed, appropriate operation and control of the electric booster 20 are required instead of the removed valves.

In this regard, the apparatus for braking using the electric booster 20 in accordance with the present disclosure performs a braking hydraulic pressure storage function (that is, secures a liquid measure) due to the removal of the suction valve and performs a braking hydraulic pressure maintaining function due to the removal of the TCV.

Hereinafter, an operation of the apparatus for braking using the electric booster 20 in accordance with the present disclosure will be described with reference to FIGS. 3A and 3B.

Figure 3A:
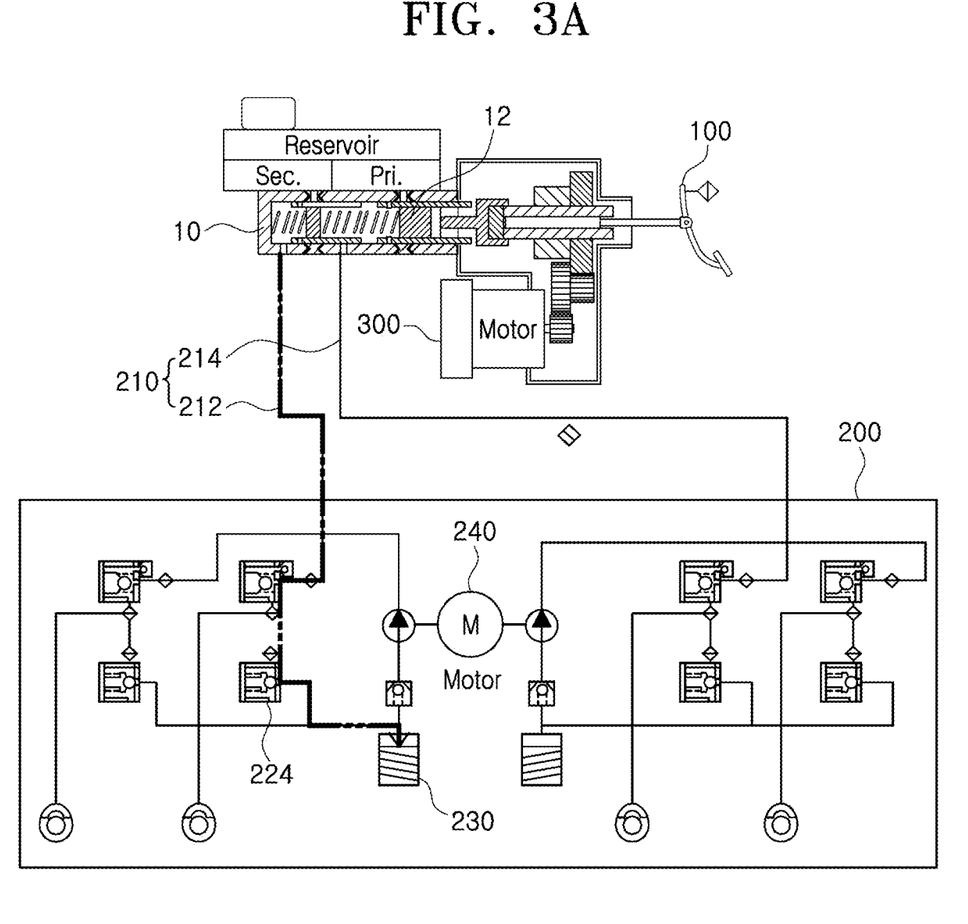
FIGS. 3A and 3B are diagrams schematically illustrating the apparatus for braking using an electric booster in accordance with an embodiment of the present disclosure.
Figure 3B:
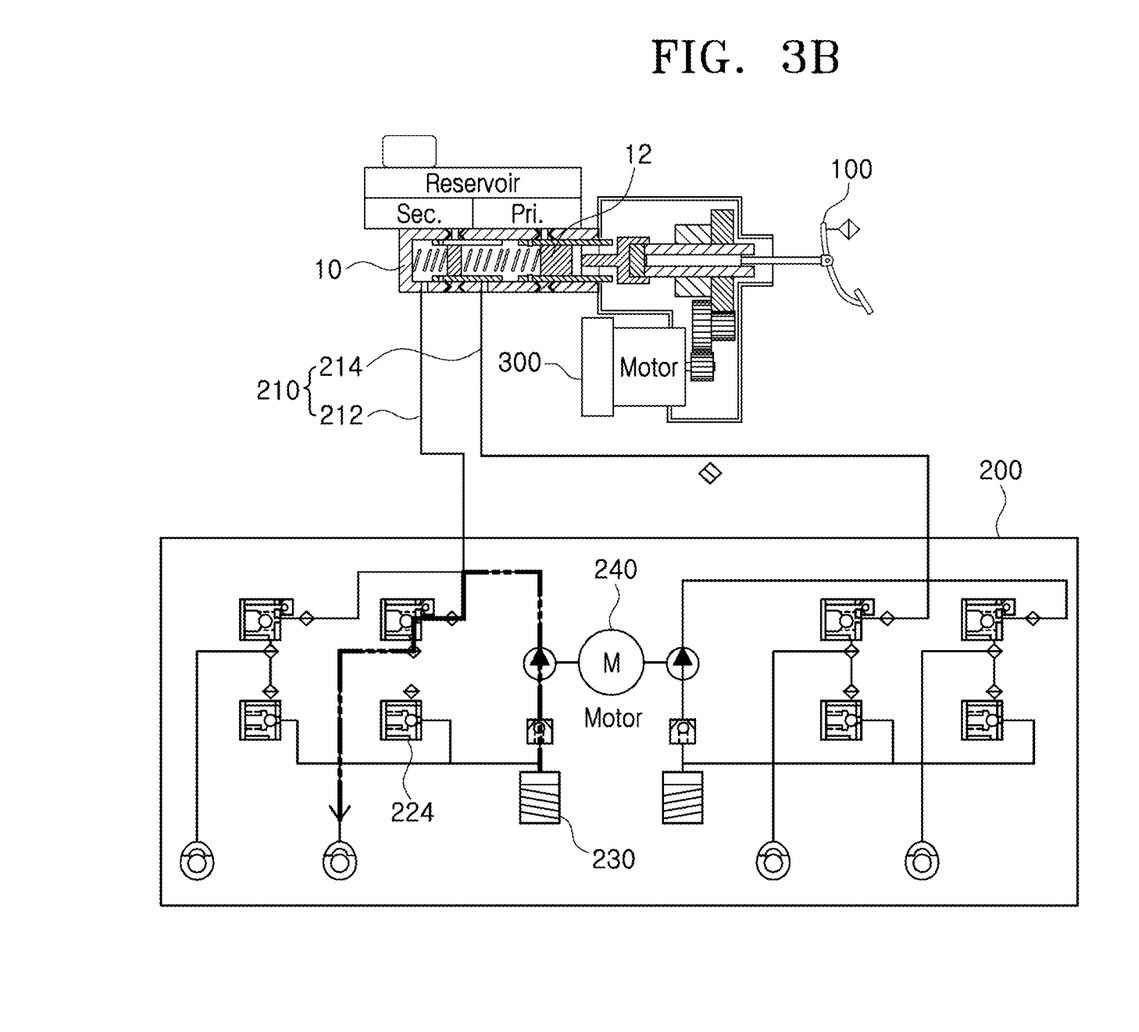
Figure 4:
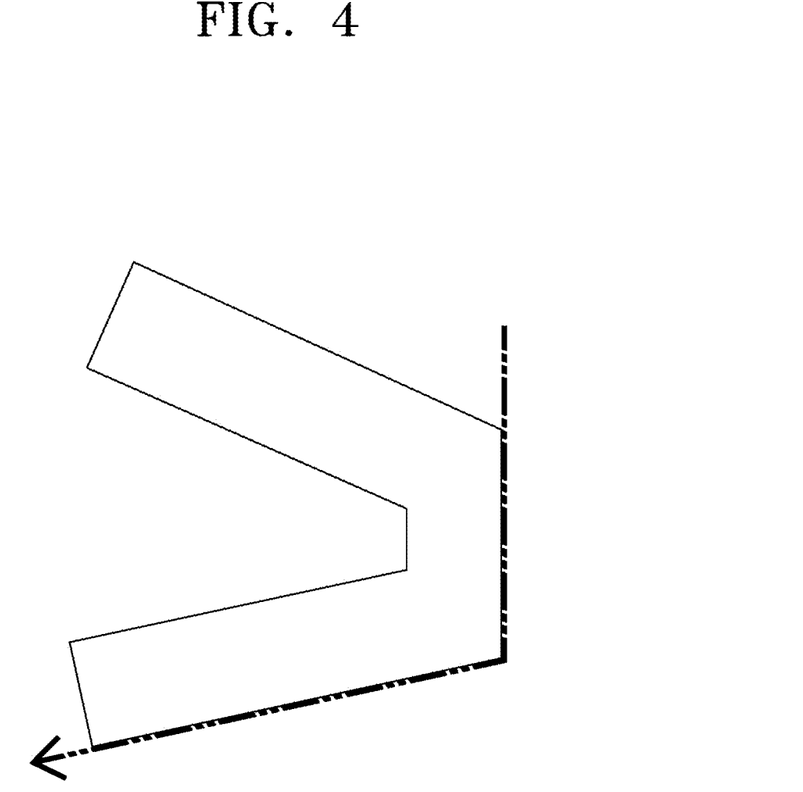
FIG. 4 is a diagram for explaining a seal-cup in accordance with an embodiment of the present disclosure.
Figure 5:
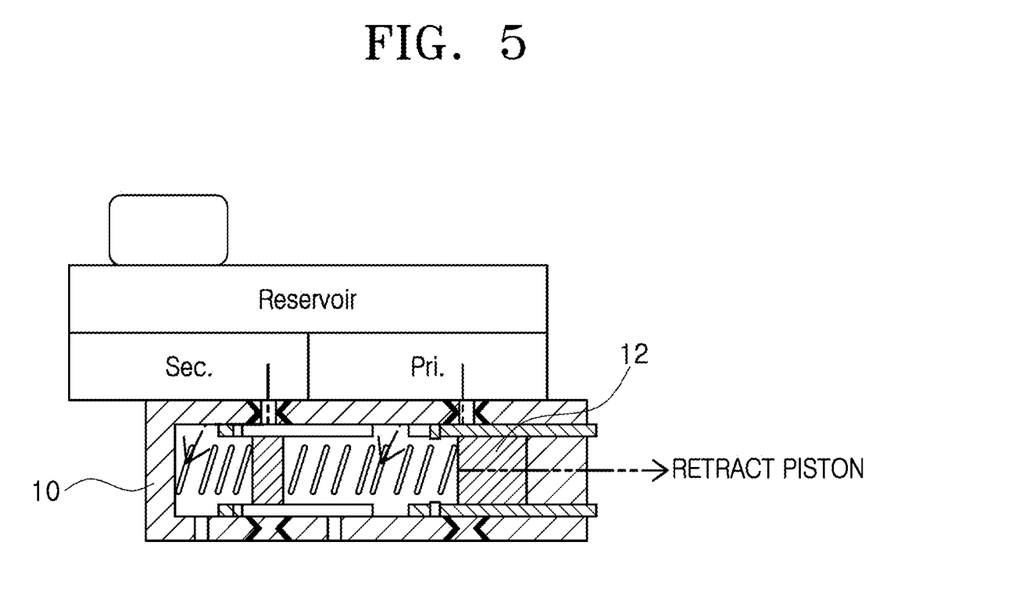
FIG. 5 is a diagram for explaining piston retraction of a master cylinder in accordance with an embodiment of the present disclosure.
Figure 6A:
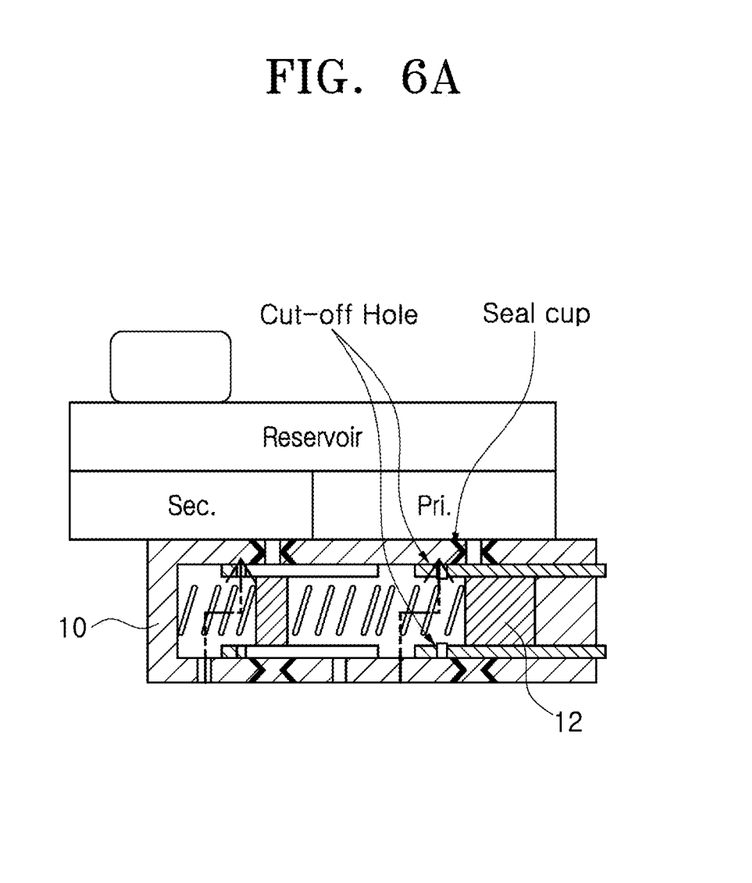
FIGS. 6A and 6B are diagrams for explaining a braking hydraulic pressure maintaining function in accordance with the present disclosure.
Figure 6B:
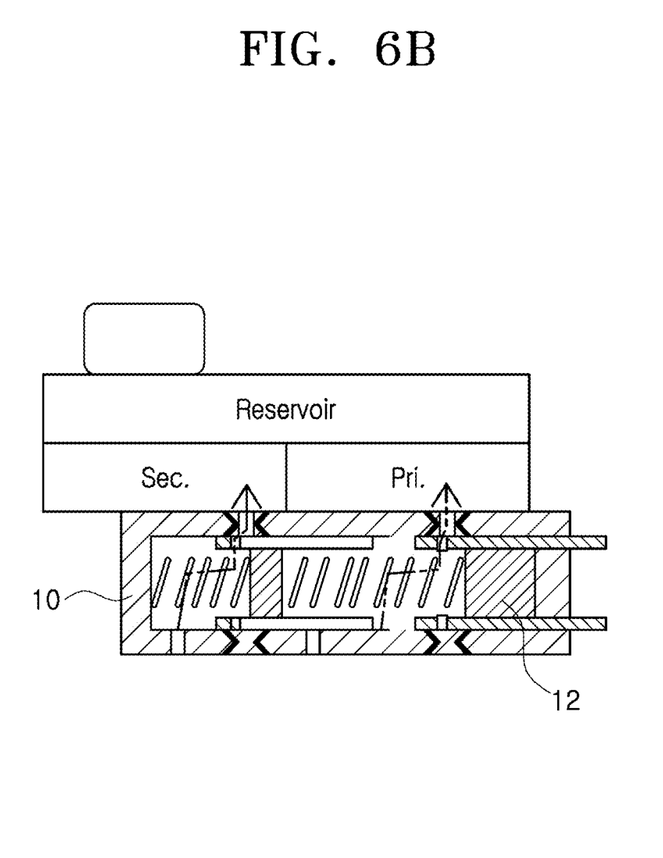

FIGS. 3A and 3B are diagrams schematically illustrating the apparatus for braking using the electric booster 20 in accordance with an embodiment of the present disclosure, FIG. 4 is a diagram for explaining a seal-cup in accordance with an embodiment of the present disclosure, FIG. 5 is a diagram for explaining piston retraction of a master cylinder in accordance with an embodiment of the present disclosure, and FIGS. 6A and 6B are diagrams for explaining the braking hydraulic pressure maintaining function in accordance with the present disclosure.

Referring to FIGS. 3A and 3B, the apparatus for braking using the electric booster 20 in accordance with an embodiment of the present disclosure includes the electric booster 20, an electric hydraulic braking unit 200, and a control unit 300.

The electric booster 20 is connected to the master cylinder 10 to press a reaction disk with the electric power of the motor 30 together with a driver's pedal force that presses a brake pedal 300 so as to press the push rod 80, and presses a piston 12 of the master cylinder 10 through the push rod 80 so as to discharge braking hydraulic pressure. Since the electric booster 20 has been described in FIG. 1, a detailed description thereof will be omitted.

The electric hydraulic braking unit 200 is connected to the master cylinder 10 of the electric booster 20 through a pair of hydraulic lines 210, stores braking hydraulic pressure discharged from the master cylinder 10 in an accumulator 230 through the hydraulic lines 210 and an outlet valve 224, and performs ESC braking by driving a pumping motor (M) 240 by using the braking hydraulic pressure stored in the accumulator 230.

The control unit 300 controls the electric booster 20 and the electric hydraulic braking unit 200, compares required braking hydraulic pressure by the driver's pedal force with preset reference hydraulic pressure when the ESC braking is required, and performs ESC braking by the electric hydraulic braking unit 200 or braking by the electric booster 20 according to a result of the comparison. When the required braking hydraulic pressure is equal to or less than the reference hydraulic pressure, the control unit 300 performs the ESC braking by the electric hydraulic braking unit 200, and when the required braking hydraulic pressure exceeds the reference hydraulic pressure, the control unit 300 performs the braking by the electric booster 20. The reference hydraulic pressure may be reference hydraulic pressure for determining an operation of the electric hydraulic braking unit 200 or an operation of the electric booster (eBooster) 20. Since the braking by the electric booster 20 is substantially the same as in the method in the related art, a detailed description thereof will be omitted.

Hereinafter, a case where the control unit 300 performs the ESC braking by the electric hydraulic braking unit 200 will be described.

When performing the ESC braking by the electric hydraulic braking unit 200, the control unit 300 opens the outlet valve (OV) 224, advances the piston 12 of the master cylinder 10 to discharge braking hydraulic pressure, closes the outlet valve 224 when the required braking hydraulic pressure by the driver's pedal force is stored in the accumulator 230, retracts the piston 12 of the master cylinder 10, and then controls the ESC braking to be performed.

That is, the control unit 300 secures braking hydraulic pressure for the ESC braking as illustrated in FIG. 3A, and performs the ESC braking by using the secured braking hydraulic pressure as illustrated in FIG. 3B.

Specifically, when suction is required due to the need for the ESC braking, the control unit 300 opens the outlet valve (OV) 224 of the electric hydraulic braking unit 200 and advances the piston 12 of the master cylinder 10 by operating the electric booster 20. The braking hydraulic pressure discharged from the master cylinder 10 is stored in the accumulator 230 of the electric hydraulic braking unit 200 via the outlet valve 224 through a first hydraulic line 212 and a second hydraulic line 214 constituting the pair of hydraulic lines 210. Then, the control unit 300 closes the outlet valve 224 and operates the electric booster 20 again in a return direction. At this time, the control unit 300 may substantially prevent the piston 12 of the master cylinder 10 from retracting beyond a cut-off hole. The control unit 300 does not operate the pumping motor 240 of the electric hydraulic braking unit 200 until the required braking hydraulic pressure is completely stored in the accumulator 230, the braking hydraulic pressure discharged when the piston 12 of the master cylinder 10 is advanced by the electric booster 20 is stored in the accumulator 230, and when the piston 12 of the master cylinder 10 is retracted by the electric booster 20, the braking hydraulic pressure is further sucked into a circuit by the characteristics of a seal-cup mechanism. That is, a seal-cup as illustrated in FIG. 4 is installed between the master cylinder 10 and the piston 12 of the master cylinder 10 so as to seal a gap between the master cylinder 10 and the piston 12 of the master cylinder 10. Accordingly, when the piston 12 of the master cylinder 10 is retracted as illustrated in FIG. 5, the braking hydraulic pressure may be further sucked by the seal-cup through the hydraulic lines 210.

In the process of advancing and retracting the piston 12 of the master cylinder 10 during the execution of the suction function, when the cut-off hole of the piston 12 of the master cylinder 10 is substantially maintained at a position exceeding the seal-cup as illustrated in FIG. 6A, the braking hydraulic pressure generated by the electric hydraulic braking unit 200 may be substantially maintained without leaking into the reservoir. When the piston 12 of the master cylinder 10 is completely returned to a home position as illustrated in FIG. 6B, the braking hydraulic pressure leaks into the reservoir and may not be substantially maintained because the fluid path of the electric hydraulic braking unit 200 is formed up to the reservoir.

When the required braking hydraulic pressure by the driver's pedal force is stored in the accumulator 230 through the process described above, the control unit 300 controls the ESC braking to be performed. Here, a sufficient liquid measure of the braking hydraulic pressure required in the process of securing the braking hydraulic pressure is generally secured in consideration of braking required in additional functions by the ESC (for example, attitude control, a Hill Hold function, and the like), and in the case of emergency braking or high-pressure braking, which requires more braking hydraulic pressure, the function may be performed by active braking of the electric booster without performing the braking by the ESC.

When the ESC braking is completed, the control unit 300 moves the piston 12 of the master cylinder 10 to the home position, and further operates the pumping motor 240 for a predetermined period of time. That is, when the ESC braking is finished, the electric booster motor 30 is further retracted to move the piston 12 to the home position, and then the ESC pumping motor 240 further operates for the predetermined period of time. This may be for returning a flow rate (or a liquid measure or a brake fluid amount), which may remain in the low-pressure accumulator 230 back to the reservoir.

Meanwhile, the accumulator capacity of the electric hydraulic braking unit 200 in accordance with the present disclosure may be designed to be larger than the existing specifications. This is for substantially preventing the accumulator capacity from being insufficient when decompression is required in the event of a situation requiring ABS control due to the liquid measure already secured in the accumulator 230 for the ESC operation.

Braking of additional functions due to general ESC braking is not a case of sudden braking, and since the operation of the electric booster is performed within a very short time in the process of securing braking hydraulic pressure, delay due to the process of securing electric hydraulic pressure does not significantly affect performance. However, in an emergency situation such as autonomous emergency braking (AEB) rather than ESC braking as general attitude control or Hill Hold function, it is possible to perform a braking function by active braking of the electric booster.

Figure 7:
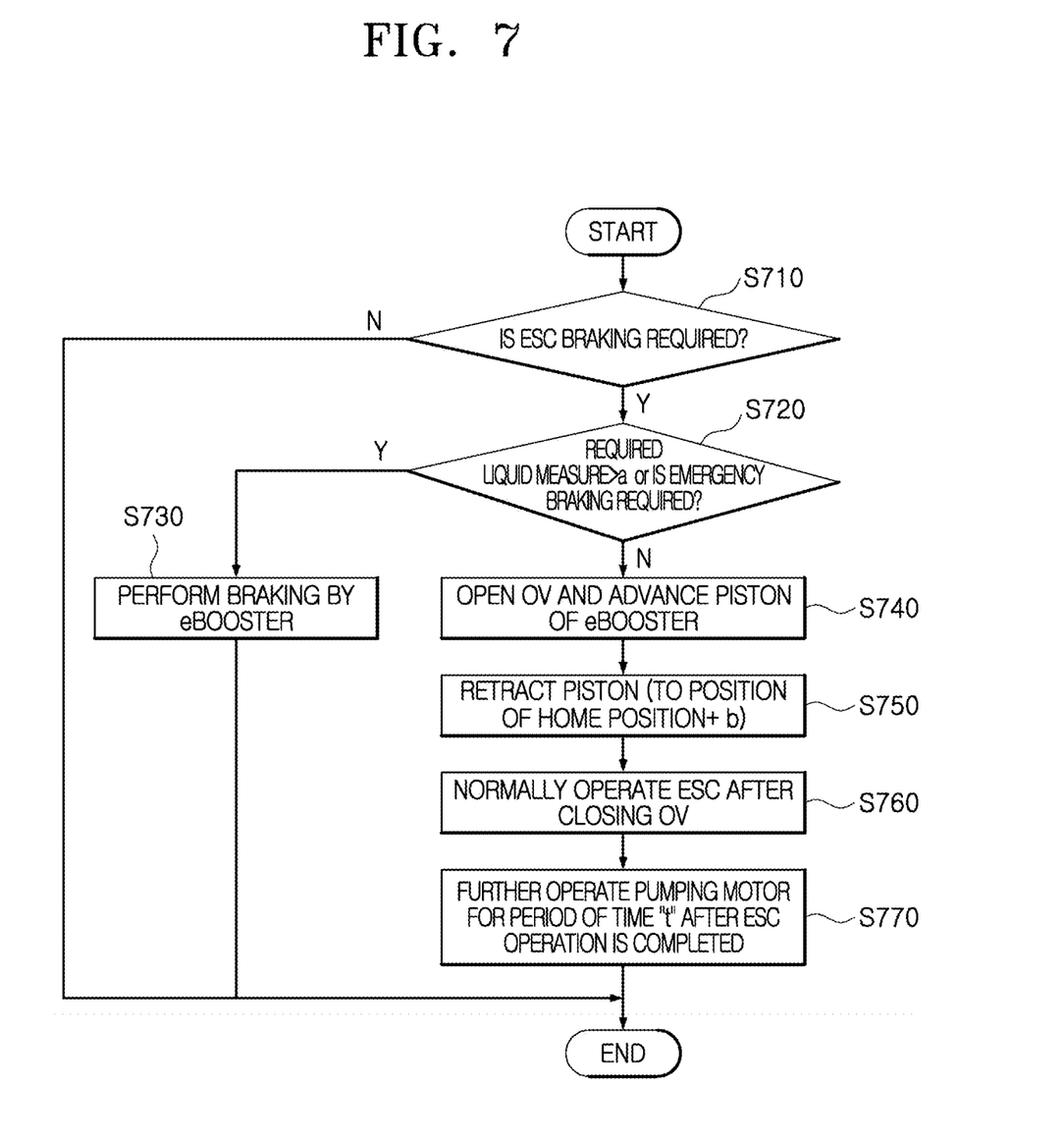
FIG. 7 is a flowchart for explaining a control method of the apparatus for braking using an electric booster in accordance with an embodiment of the present disclosure.

FIG. 7 is a flowchart for explaining a control method of the apparatus for braking using an electric booster in accordance with an embodiment of the present disclosure.

Referring to FIG. 7, the control unit 300 determines whether ESC braking is required (S710), and compares required braking hydraulic pressure by a driver's pedal force with preset reference hydraulic pressure a when the ESC braking is required (S720).

As a result of the comparison in step S720, when the required braking hydraulic pressure exceeds the reference hydraulic pressure, the control unit 300 performs braking by the electric booster 20 (S730).

As a result of the comparison in step S720, when the required braking hydraulic pressure is equal to or less than the reference hydraulic pressure, the control unit 300 opens the outlet valve 224 of the electric hydraulic braking unit 200, and advances the piston 12 of the master cylinder 10, thereby storing braking hydraulic pressure discharged from the master cylinder 10 in the accumulator 230 through the hydraulic lines 210 and the outlet valve 224 (S740).

When the required braking hydraulic pressure by the driver's pedal force is stored in the accumulator 230 by performing step S740, the control unit 300 retracts the piston 12 of the master cylinder 10 (S750). At this time, the control unit 300 may retract the piston 12 of the master cylinder 10 to the position of the sum of the home position and an invalid stroke of the master cylinder 10.

When step S750 is performed, the control unit 300 closes the outlet valve 224 and performs the ESC braking (S760).

Then, the control unit 300 further operates the pumping motor 240 for a predetermined period of time t (S770).

In the above, the step of storing the braking hydraulic pressure and the step of performing the ESC braking are performed separately, but the step of storing the braking hydraulic pressure and the step of performing the ESC braking may be performed simultaneously.

Hereinafter, a case where the step of storing the braking hydraulic pressure and the step of performing the ESC braking are performed simultaneously will be described with reference to FIG. 8.

Figure 8:
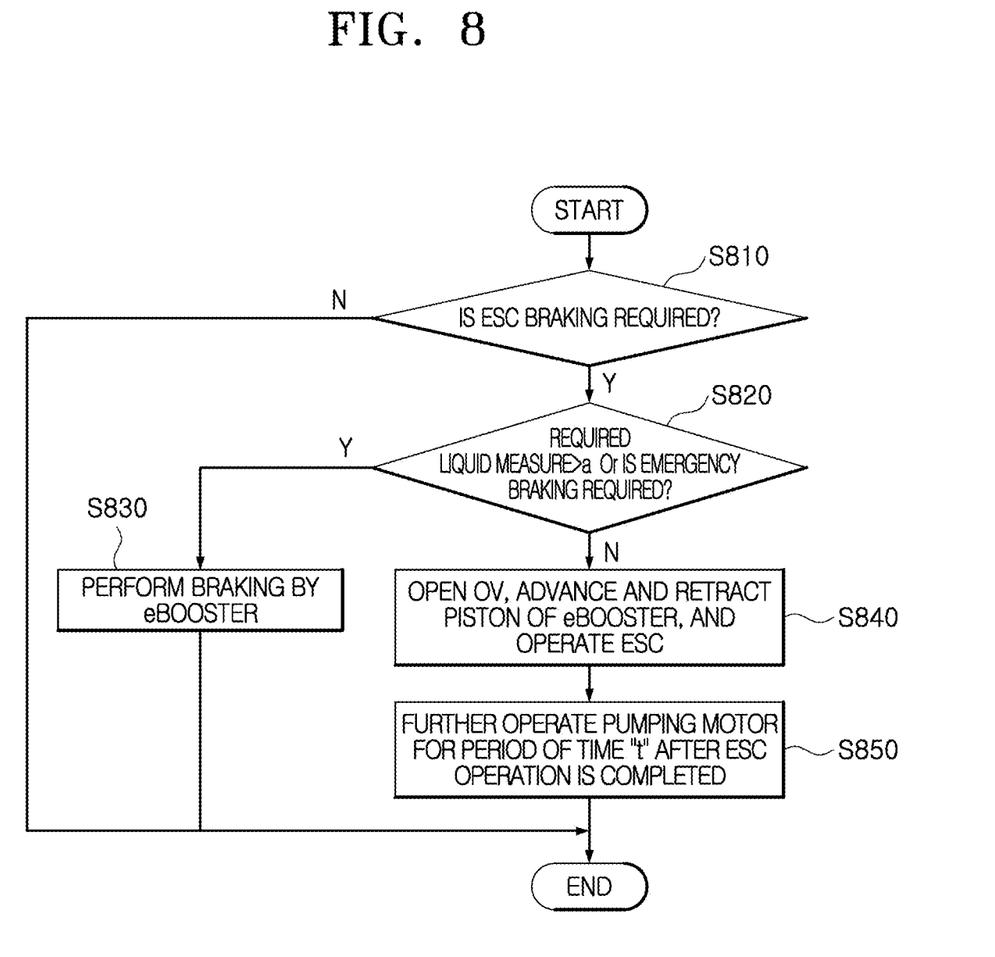
FIG. 8 is a flowchart for explaining a control method of an apparatus for braking using an electric booster in accordance with another embodiment of the present disclosure.

FIG. 8 is a flowchart for explaining a control method of the apparatus for braking using an electric booster in accordance with another embodiment of the present disclosure.

Referring to FIG. 8, the control unit 300 determines whether ESC braking is required (S810), and compares required braking hydraulic pressure by a driver's pedal force with preset reference hydraulic pressure a when the ESC braking is required (S820).

As a result of the comparison in step S820, when the required braking hydraulic pressure exceeds the reference hydraulic pressure, the control unit 300 performs braking by the electric booster 20 (S830).

As a result of the comparison in step S820, when the required braking hydraulic pressure is equal to or less than the reference hydraulic pressure, the control unit 300 opens the outlet valve 224 of the electric hydraulic braking unit 200, and advances or retracts the piston 12 of the master cylinder 10, thereby performing the ESC braking while storing braking hydraulic pressure discharged from the master cylinder 10 in the accumulator 230 through the hydraulic lines 210 and the outlet valve 224 (S840).

Then, the control unit 300 further operates the pumping motor 240 for a predetermined period of time t (S850).

In the case where the step of storing the braking hydraulic pressure and the step of performing the ESC braking are performed simultaneously, when the piston 12 of the master cylinder 10 is returned by the electric booster 20, the braking hydraulic pressure in the low-pressure accumulator 230 rises back to the fluid path by the motor pumping of the electric hydraulic braking unit 200. Thus, the amount of the braking hydraulic pressure sucked from the reservoir may be slightly reduced. However, such a disadvantage may be compensated for by allowing the return speed by the electric booster 20 to be faster than the ESC motor pumping and enhancing the piston return spring force of the master cylinder 10.

As described above, according to an apparatus for braking using an electric booster and a control method thereof in accordance with an aspect of the present disclosure, braking hydraulic pressure is stored in an accumulator of an electric hydraulic braking unit when braking control is performed using an electric booster and ESC braking is performed using the stored braking hydraulic pressure, resulting in an effect that the cost of the braking apparatus using the electric booster is reduced.

Although the present disclosure has been described with reference to the embodiments illustrated in the drawings, the embodiments of the disclosure are for illustrative purposes only, and those skilled in the art will appreciate that various modifications and other equivalent embodiments are possible.

Thus, the true technical scope of the present disclosure should be defined by the following claims.

What is claimed is:

1. An apparatus for braking using an electric booster, comprising:
    an electric booster connected to a master cylinder and configured to discharge braking hydraulic pressure by pressing a piston of the master cylinder with electric power of a motor together with a driver's pedal force that presses a brake pedal;
    an electric hydraulic braking unit connected to the master cylinder through a pair of hydraulic lines, and configured to store braking hydraulic pressure discharged from the master cylinder in an accumulator through the hydraulic lines and an outlet valve and to drive a pumping motor using the braking hydraulic pressure stored in the accumulator to perform electronic stability control (ESC) braking; and
    a control unit configured to control the electric booster and the electric hydraulic braking unit, to compare a required braking hydraulic pressure by the driver's pedal force with preset reference hydraulic pressure when the ESC braking is required, and to perform ESC braking by the electric hydraulic braking unit or braking by the electric booster according to a result of the comparison, wherein, in response to the required braking hydraulic pressure equal to or less than the reference hydraulic pressure, the control unit performs the ESC braking by the electric hydraulic braking unit, and in response to the required braking hydraulic pressure that exceeds the reference hydraulic pressure, the control unit performs the braking by the electric booster.

2. The apparatus for braking using an electric booster according to claim 1, wherein, when performing the ESC braking by the electric hydraulic braking unit, the control unit opens the outlet valve, advances the piston of the master cylinder to discharge braking hydraulic pressure, and when the required braking hydraulic pressure by the driver's pedal force is stored in the accumulator, the control unit closes the outlet valve, retracts the piston of the master cylinder, and controls the ESC braking to be performed.

3. The apparatus for braking using an electric booster according to claim 2, wherein, when the piston of the master cylinder is retracted, the control unit substantially prevents the piston from retracting beyond a cut-off hole.

4. The apparatus for braking using an electric booster according to claim 2, wherein the control unit does not operate the pumping motor until the required braking hydraulic pressure is completely stored in the accumulator.

5. The apparatus for braking using an electric booster according to claim 2, wherein, when the ESC braking is completed, the control unit moves the piston of the master cylinder to a home position, and further operates the pumping motor for a predetermined period of time.

6. A control method of an apparatus for braking using an electric booster, which is connected to a master cylinder and discharges braking hydraulic pressure by pressing a piston of the master cylinder with electric power of a motor together with a driver's pedal force that presses a brake pedal, the control method comprising:
    when ESC braking is required, comparing, by a control unit, required braking hydraulic pressure by the driver's pedal force with preset reference hydraulic pressure; and
    when the required braking hydraulic pressure is equal to or less than the reference hydraulic pressure, performing, by the control unit, ESC braking by an electric hydraulic braking unit connected to the master cylinder through a pair of hydraulic lines, wherein performing the ESC braking by the electric hydraulic braking unit comprises:

opening, by the control unit, an outlet valve of the electric hydraulic braking unit, advancing the piston of the master cylinder, and storing braking hydraulic pressure discharged from the master cylinder in an accumulator through the hydraulic lines and the outlet valve; and when the required braking hydraulic pressure by the driver's pedal force is stored in the accumulator, by the control unit, retracting the piston of the master cylinder, closing the outlet valve, and performing the ESC braking.

7. The control method according to claim 6, wherein, in the step of performing the ESC braking, when the piston of the master cylinder is retracted, the control unit substantially prevents the piston from retracting beyond a cut-off hole.

8. The control method according to claim 6, further comprising, after the step of performing the ESC braking:

moving, by the control unit, the piston of the master cylinder to a home position, and further operating a pumping motor for a predetermined period of time.

9. The control method according to claim 6, wherein, when the required braking hydraulic pressure exceeds the reference hydraulic pressure, the control unit performs braking by the electric booster.

10. The control method according to claim 6, wherein, in the step of performing the ESC braking by the electric hydraulic braking unit, the control unit opens an outlet valve of the electric hydraulic braking unit, advances or retracts the piston of the master cylinder, and performs the ESC braking while storing the braking hydraulic pressure discharged from the master cylinder in the accumulator through the hydraulic lines and the outlet valve.

* * * * *